United States Patent [19]
Ueta

[11] Patent Number: 5,370,406
[45] Date of Patent: * Dec. 6, 1994

[54] METALLIC LAMINATE GASKET WITH PLATES OF DIFFERENT BEAD WIDTHS FIXED TOGETHER

[75] Inventor: Kosaku Ueta, Kumagaya, Japan

[73] Assignee: Nihon Metal Gasket Co., Ltd., Kumagaya, Japan

[ * ] Notice: The portion of the term of this patent subsequent to Jul. 27, 2010 has been disclaimed.

[21] Appl. No.: 13,068

[22] Filed: Feb. 3, 1993

Related U.S. Application Data

[63] Continuation of Ser. No. 729,957, Jul. 15, 1991, Pat. No. 5,230,521.

[30] Foreign Application Priority Data

Jan. 11, 1991 [JP] Japan ................................. 3-13866
May 23, 1991 [JP] Japan ................................ 3-147781

[51] Int. Cl.$^5$ ............................................. F16J 15/08
[52] U.S. Cl. ................................ 277/235 B; 277/234; 277/236
[58] Field of Search ................... 277/233, 234, 235 R, 277/235 B, 236

[56] References Cited

U.S. PATENT DOCUMENTS

| | | |
|---|---|---|
| 2,197,916 | 4/1940 | Balfe . |
| 3,668,036 | 6/1972 | Farnam . |
| 3,817,540 | 6/1974 | Nicholson . |
| 4,290,616 | 9/1981 | Nicholson . |
| 4,428,593 | 1/1984 | Pearlstein . |
| 4,714,260 | 12/1987 | Udagawa . |
| 4,721,315 | 1/1988 | Ueta . |
| 4,728,110 | 3/1988 | Nakasone . |
| 4,759,585 | 7/1988 | Udagawa . |
| 4,810,591 | 3/1989 | Sakai . |
| 4,836,562 | 6/1989 | Yoshino . |
| 4,869,519 | 9/1989 | Udagawa et al. . |
| 4,896,891 | 1/1990 | Udagawa . |
| 4,898,396 | 2/1990 | Udagawa . |
| 4,948,153 | 8/1990 | Takahashi et al. . |
| 5,004,250 | 4/1991 | Udagawa . |
| 5,230,521 | 7/1993 | Ueta . |

FOREIGN PATENT DOCUMENTS

| | | |
|---|---|---|
| 261761 | 11/1987 | Japan . |
| 293363 | 11/1988 | Japan . |
| 83842 | 3/1989 | Japan . |
| 104953 | 4/1989 | Japan . |
| 285645 | 11/1989 | Japan . |
| 1549200 | 7/1979 | United Kingdom . |

OTHER PUBLICATIONS

"Metal Handbook"; 1948 Edition, ASM; pp. 841, 902, 925–926.

Primary Examiner—Scott W. Cummings
Attorney, Agent, or Firm—Varndell Legal Group

[57] ABSTRACT

This invention provides a metallic gasket which assures to impart a sufficient sealing function to an engine having a limited inter-bore space and can make the pressure applied around the bores uniform and keep the roundness of the bores intact. This metallic gasket is constructed from two base plates of an elastic material, beads on one base plate being larger in width than beads on the other plate, and is characterized in that the base plates are fixed together at their flat segments located closer to the center of the bores than to the center of the beads and along the circumference of the bores.

9 Claims, 3 Drawing Sheets

FIG. IA
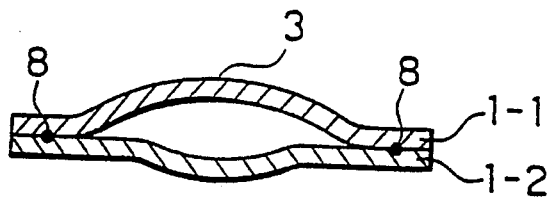
FIG. IB
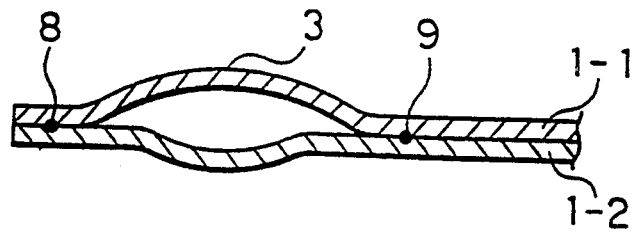
FIG. 2
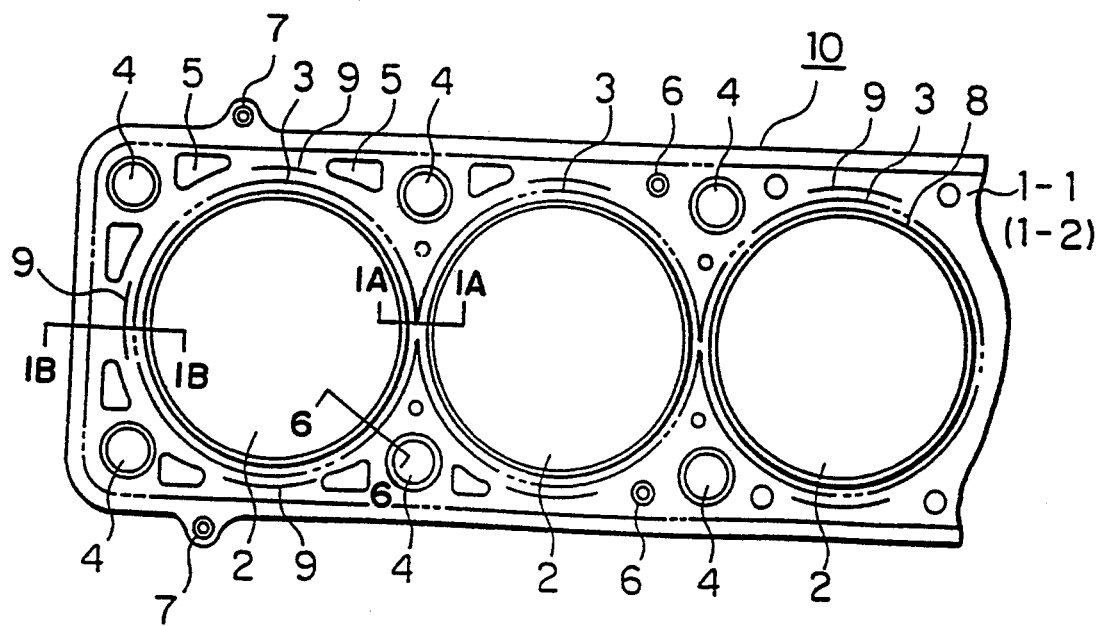

METALLIC LAMINATE GASKET WITH PLATES OF DIFFERENT BEAD WIDTHS FIXED TOGETHER

CROSS REFERENCE TO RELATED APPLICATION

This application is a continuation application of U.S. Ser. No. 07/729,957, filed Jul. 15, 1991, now U.S. Pat. No. 5,230,521.

BACKGROUND OF THE INVENTION

The present invention relates to a metallic gasket designed to be interposed between the joining surfaces of a cylinder head and a cylinder block which form part of an internal combustion engine, thereby preventing leakages of combustion gas, cooling water, lubricating oil, etc.

DESCRIPTION OF THE PRIOR ART

Between the joining surfaces of a cylinder block and a cylinder head forming part of an internal combustion engine, there is interposed a gasket to impart a sealing function thereto, as well known in the art. Of particular importance is a seal to be provided around a combustion chamber. A failure in providing sufficient sealing to the combustion chamber would cause a leakage of the combustion gas from within, resulting in a pressure drop.

Thus, an array of beads are located concentrically with a combustion chamber opening formed in an elastic base plate of a metallic gasket. As the metallic gasket is clamped in place by means of bolts, the beads produce repulsive force, which is in turn used to impart a sealing function to the peripheral edge of the combustion chamber bore.

In order to prevent the breaking-down of the beads by fatigue in this case, for instance, stoppers are located on flat segments of the metallic gasket between the combustion chamber bore and the beads, thereby limiting the magnitude of amplitude of the beads. Various proposals have so far been made as to where such stoppers are to be mounted and what form they are to take. As set forth in JP-A-60-292893 specification by way of example, an auxiliary plate covered with grommet is inserted between two base plates including beads thereon and the bends of this grommet are used as stoppers.

The above-mentioned technique makes use of a system wherein stoppers are mounted on flat segments defined at both sides of beads located between cylinder bores (adjacent cylinders).

In recent years, however, higher-performance and weight-saving engines of smaller size and larger displacement have been in great demand, and so the engines have been designed to have so limited spaces between cylinder bores (adjacent cylinders) that stoppers cannot be mounted on both sides of beads. In addition, the pressure applied around the cylinder bores becomes so ununiform that considerable difficulty is involved in keeping the roundness of the bores intact.

It is noted that an extreme decrease in the width of stoppers is tantamount to causing a local increase in the pressure, only to make a dent on the surface of the engine joined to the gasket. In addition, stoppers of extremely limited width are difficult to hold.

SUMMARY OF THE INVENTION

In view of the foregoing, the present invention seeks to provide a metallic gasket which is not only limited in terms of the amplitude of vibration due to the operation of an engine, but is also prevented from breaking down by fatigue and makes the pressure applied around the bores uniform, even when it is applied to an engine having a limited interbore space.

BRIEF DESCRIPTION OF THE DRAWINGS

FIGS. 1A and 1B are schematic views of one embodiment of the metallic gasket according to this invention; FIG. 1A being a sectional view taken along the line 1A—1A of FIG. 2 to be described just below and FIG. 1B a sectional view taken along the 1B—1B line of FIG. 2, FIG. 2 is a schematic plan view of the embodiment of FIG. 1.

DETAILED DESCRIPTION OF THE EMBODIMENTS

Figure 3:
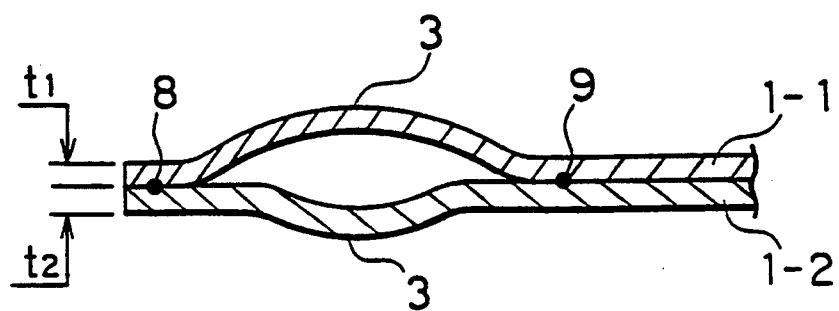
FIG. 3 is a schematic view showing another embodiment of the metallic gasket according to this invention.

The present invention will now be explained more specifically but not exclusively with reference to the accompanying drawings.

FIGS. 1A and 1B are sectional views illustrative of one embodiment of the metallic gasket according to this invention, and FIG. 2 is a partly cut-away, schematic plan view of that metallic gasket; FIGS. 1A and 1B are sectional views taken along the lines 1A—1A and 1B—1B of FIG. 2, respectively.

Referring first to the general plan construction shown in FIG. 2, a metallic gasket body, shown at 10, includes two base plates 1-1 and 1-2, each made of an elastic material, and has openings 2 located in association with combustion chamber bores, each of which is provided at its outer edge with a concentric array of beads 3. It is noted that reference numberal 3 stands for the center of each bead, 4 a bolt hole through which a bolt or screw is inserted to fix the metallic gasket in place when it is built in an engine, 5 a hole through which cooling water circulates, and 6 an oil hole, all these parts being laminated, made integral and fixed at 7. Reference numerals 8 and 9 represent junction locations.

The sectional construction of the metallic gasket will now be explained with reference to FIGS. 1A and 1B, wherein the same parts as in FIGS. 1A and 1B are indicated by the same reference numerals.

As illustrated in FIG. 1A, the metallic gasket includes two base plates 1-1 and 1-2, each made of an elastic material. In what follows, the base plates 1-1 and 1-2 will be referred to as the first and second plates, respectively. Basically, the two base plates are designed to have different spring constants. In other words, the first plate 1-1 has a spring constant decreased by increasing the width of the bead, while the second plate 1-2 has a spring constant increased by decreasing the width of the bead.

More specifically, the bead width on the second plate 1-2 is limited to 75% or less of that of the first plate 1-1 so as to increase its spring constant. Reference numeral 8 represents a joint position of the first and second plates, which is closer to the combustion chamber than to the beads, extending along the circumference of the combustion chamber. Similarly, reference numeral 9 indicates a joint position. It is noted, however, that only the required regions are illustrated. Each region is located at an inter-bolt position and is so designed to receive a low bolt-clamping pressure that it is welded or bonded over a given length. This is also true of FIG. 1B. The base plates may be formed of springy SUS 301 or SUS 304 with a thickness lying in the range of 0.20 to 0.30 mm.

Reference will now be made to how the metallic gasket according to this embodiment acts.

As the metallic gasket 10 is mounted and clamped onto an engine, the first plate 1-1 varies largely because of its decreased spring constant, but the second plate 1-2 is less likely to vary. Thus, both the plates are so fixed to each other at the joint position 8 that they can be in a well-balanced state with respect to the engine's rigidity.

In short, the bead on the first plate extends prematurely due to its decreased spring constant, but it is kept well-balanced with respect to the pressure applied to the engine by the combined spring force of the first with the second bead, since it is fixed at both its ends to the second plate having an increased spring constant. Thus, the value of amplitude of the beads is limited, enabling durability to be imparted to the metallic gasket.

FIG. 3, corresponding to FIG. 1B, shows the construction of another embodiment of this invention.

According to this embodiment, the first and second plates 1-1 and 1-2 is designed to meet the following relation:

$$t_1 \leq t_2$$

wherein $t_1$ is the thickness of the first plate and $t_2$ is the thickness of the second plate, whereby their spring constants are varied. This embodiment is otherwise similar to the embodiment shown in FIG. 1B.

Figure 4:
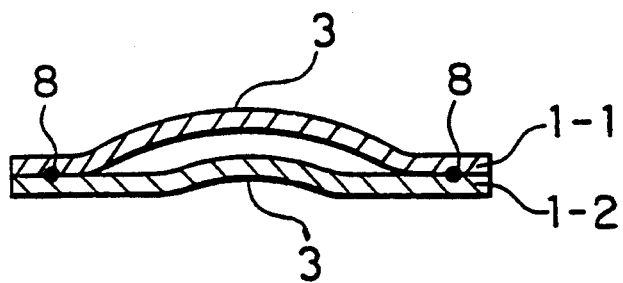
FIG. 4 is a schematic view showing a further embodiment of the metallic gasket according to this invention.

FIG. 4 shows the construction of a further embodiment of the metallic gasket according to this invention, which is similar to that shown in FIG. 1A with the exception that beads on the first and second plates are arched in the same direction.

Even with this embodiment, the resulting effects are similar to those achieved with the foregoing embodiments.

Figure 5:
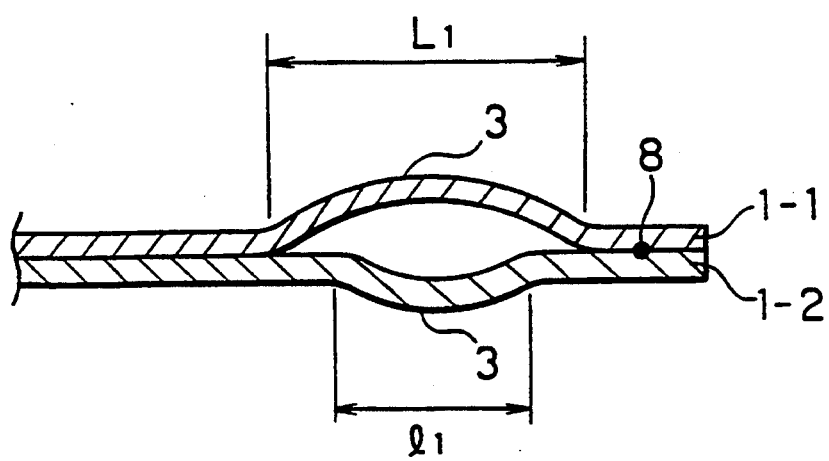
FIG. 5 is a schematic view of a still further embodiment of the metallic gasket according to this invention, as taken along the line 1B—1B of FIG. 2.
Figure 6:
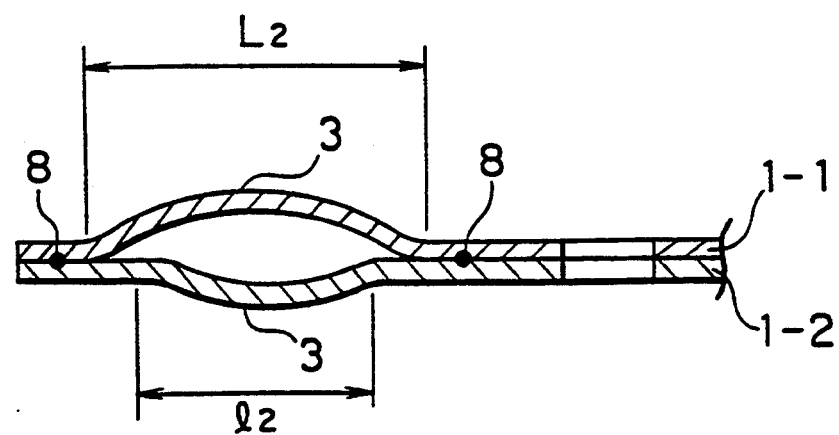
FIG. 6 is a schematic view of a still further embodiment of the metallic gasket according to this invention, as taken along the line 6—6 of FIG. 2.

FIG. 5, which is a sectional view as taken along the line 1B—1B of FIG. 2, shows the construction of a still further embodiment of the metallic gasket according to this invention. Similarly, FIG. 6 is a sectional view as taken along the line 6—6 of FIG. 2. As can be seen, the 1B—1B section receives low pressure because of being located between clamping bolts, whereas the 6—6 section receives high pressure because of being located at clamping bolt positions. Thus, the section to receive high pressure can be preset at a spring constant lower than that of the section to receive low pressure ($L_1 > L_2$, $l_1 > l_2$), and vice versa. It is understood that the height of the bead should not exceed 10% of the width of the bead.

While the foregoing embodiments have been described with reference to an engine arrangement having a narrow inter-bore space, this invention is not limited thereto and so may equally be applied to engine arrangements having a wide inter-bore space.

According to the gasket of this invention wherein, as described above, two base plates to be laminated together are each provided with an array of beads, the beads on the upper base plate are varied in width from the beads on the lower base plate to make a difference in spring constant there between. The upper and lower base plates are fixed together at flat segments closer to an associated bore (i.e., at the peripheral edges of the openings for the combustion bores) than to the beads. This makes it possible not only to assure that sufficient pressure is applied to the gasket even when the inter-bore space is narrow but also to apply uniform pressure to the gasket without making any dent on its surface to engage an engine. Thus, it is possible to keep the roundness of the cylinders intact with no particular need to taking where the stoppers are to be located into account.

What is claimed is:

1. A metallic gasket comprising first and second resilient metal base plates, each said base plate having an array of beads arranged at peripheral edges of openings for combustion bores, said beads on said first base plate having a width different than that of said beads on said second base plate, said beads respectively having a height of 10% or less of said width, and said first and second base plates are fixed together by joints located between said first and second base plates at respective flat segments of said first and second base plates, said joints being spaced from said peripheral edges and arranged at a position closer to said peripheral edges than to said beads and about circumferences of said bores.

2. The metallic gasket of claim 1, wherein said joints prevent relative movement of said first and second base plates in an area about said joints.

3. The metallic gasket of claim 1, wherein said joints are welds.

4. The metallic gasket of claim 1, wherein said joints bond said first and second base plates together.

5. The metallic gasket of claim 1, wherein said width of said beads on said first base plate is in the range of 75% or less of said width of said beads on said second base plate.

6. The metallic gasket of claim 1, wherein said joints are located at a region which receives low pressure.

7. The metallic gasket of claim 1, wherein said first and second base plates have different thicknesses.

8. The metallic gasket of claim 1, wherein said first and second base plates are fixed together by said joints only at a position closer to said peripheral edges than to said beads and about circumferences of said bores, and said joints are respectively arranged on portions of said first and second base plates which receive low pressure for providing uniform pressure in use.

9. The metallic gasket of claim 1, wherein said beads on said first and second base plates are arched in a same direction.

* * * * *